(12) United States Patent
Williams

(10) Patent No.: US 11,560,730 B2
(45) Date of Patent: Jan. 24, 2023

(54) SYSTEM AND METHOD FOR FINDING DENTS ON AN AUTOMOBILE USING A BOOTH

(71) Applicant: Thomas Williams, Montgomery, TX (US)

(72) Inventor: Thomas Williams, Montgomery, TX (US)

( * ) Notice: Subject to any disclaimer, the term of this patent is extended or adjusted under 35 U.S.C. 154(b) by 0 days.

(21) Appl. No.: 15/398,056

(22) Filed: Jan. 4, 2017

(65) Prior Publication Data

US 2018/0187409 A1    Jul. 5, 2018

(51) Int. Cl.
*E04H 15/20* (2006.01)
*B60S 5/00* (2006.01)
*E04H 6/02* (2006.01)
*G01N 21/88* (2006.01)

(52) U.S. Cl.
CPC .......... *E04H 6/02* (2013.01); *G01N 21/8803* (2013.01); *B60S 5/00* (2013.01); *E04H 15/20* (2013.01); *G01N 2021/8829* (2013.01)

(58) Field of Classification Search
CPC . G06Q 40/08; B60P 3/14; B60P 3/025; B60P 3/12; B60P 3/122; E04H 1/1205; E04H 2015/201; E04H 15/20; E04H 6/025; B60S 5/00
See application file for complete search history.

(56) References Cited

U.S. PATENT DOCUMENTS

| | | | | | |
|---|---|---|---|---|---|
| 4,416,068 | A | * | 11/1983 | Nilsson | B05D 3/0263 118/642 |
| 4,486,479 | A | * | 12/1984 | F'Geppert | B32B 3/28 428/34.1 |
| 4,629,319 | A | * | 12/1986 | Clarke | G01N 21/88 356/237.2 |
| 4,736,762 | A | * | 4/1988 | Wayman | A61G 10/005 128/205.26 |
| 5,282,145 | A | * | 1/1994 | Lipson | F26B 3/283 118/642 |
| 5,436,726 | A | * | 7/1995 | Ventura | G01B 11/25 356/237.2 |
| 5,636,024 | A | * | 6/1997 | Crookham | G01M 11/005 356/237.1 |

(Continued)

FOREIGN PATENT DOCUMENTS

| | | |
|---|---|---|
| DE | 202004014281 | 2/2005 |
| DE | 102006019154 | 4/2010 |

(Continued)

*Primary Examiner* — Phi D A
(74) *Attorney, Agent, or Firm* — Bushman Werner, P.C.

(57) ABSTRACT

A system and method for finding dents on an automobile is described herein. The system, in one embodiment, can be a booth that has a support structure, a plurality of wall sections, a roof, and interior surface defined at least in part by the wall sections and the roof, and a first geometric repeating pattern on a first region of the interior space. The method in one embodiment, can be receiving an automobile within the booth described above, illuminating the booth to cause the first geometric repeating pattern of the booth to reflect off a surface of said automobile; and identifying presence of defects using a reflected pattern, the reflected pattern a reflected image of the first geometric repeating pattern on the automobile.

7 Claims, 11 Drawing Sheets

(56) References Cited

U.S. PATENT DOCUMENTS

| | | | |
|---|---|---|---|
| 5,726,705 A * | 3/1998 | Imanishi | G01N 21/8806 348/92 |
| 6,012,825 A * | 1/2000 | Horner | F21V 7/005 362/219 |
| 6,029,404 A * | 2/2000 | Lewis | E04B 9/06 52/2.11 |
| 6,055,860 A * | 5/2000 | Pfanstiehl | G01N 33/32 73/600 |
| 6,220,263 B1 * | 4/2001 | Randmae | B60J 11/00 135/115 |
| 6,266,138 B1 * | 7/2001 | Keshavmurthy | G01B 11/303 356/237.2 |
| 6,278,517 B1 * | 8/2001 | Willing | G01N 21/8806 356/237.2 |
| 6,467,221 B1 * | 10/2002 | Bigelow | B64D 11/00 244/171.9 |
| 8,355,581 B2 * | 1/2013 | Noy | G06T 1/0007 382/199 |
| 8,982,207 B2 * | 3/2015 | Jang | B64F 5/60 348/128 |
| 9,424,606 B2 * | 8/2016 | Wilson, II | G06Q 40/08 |
| 9,509,960 B2 * | 11/2016 | Mirza | B60R 1/00 |
| 9,604,563 B1 * | 3/2017 | Wilson, II | B60P 3/14 |
| 9,792,526 B2 * | 10/2017 | Kilpatrick | G06K 9/6215 |
| 9,871,977 B2 * | 1/2018 | Broughton | H04N 5/2354 |
| 2002/0223653 | 10/2005 | Mower et al. | |
| 2006/0114531 A1 * | 6/2006 | Webb | G01N 21/8851 359/15 |
| 2009/0249701 A1 * | 10/2009 | Turcot | E04H 15/20 52/2.18 |
| 2010/0146868 A1 * | 6/2010 | Lukasiewicz | E04H 15/20 52/2.11 |
| 2010/0272915 A1 | 10/2010 | Laws | |
| 2015/0017338 A1 * | 1/2015 | Wiliams | B05D 5/00 427/421.1 |
| 2015/0040487 A1 | 2/2015 | Williams | |
| 2016/0097725 A1 * | 4/2016 | Porter | G01N 21/8803 356/237.2 |
| 2017/0081867 A1 * | 3/2017 | Wasson | E04H 15/20 |
| 2018/0187409 A1 * | 7/2018 | Williams | E04H 6/02 |

FOREIGN PATENT DOCUMENTS

| | | |
|---|---|---|
| DE | 102010015566 | 10/2011 |
| WO | 2009083251 | 7/2009 |

\* cited by examiner

SYSTEM AND METHOD FOR FINDING DENTS ON AN AUTOMOBILE USING A BOOTH

BACKGROUND

This disclosure relates to a system and method for finding dents on an automobile using a booth.

Hail and other impacts can leave dents and creases on the body of an automobile. Such minor damages can ruin the aesthetics of the automobile thus, methods for removing dents on the body of an automobile has evolved over the years. One of the methods for repairing dent is known as paintless dent repair (PDR). In this method, it is significant to be able to locate the position of the dents precisely. As such, technicians need to use a PDR reading instruments such as paintless dent repair light, reflection boards, fluorescent, or light-emitting diode (LED) lighting to properly assess and locate the dents. This method can be effective in locating and assessing the dent but can only do it from one specific area to another. Technicians would need to move the PDR reading instruments in order to locate the dents of an entire car. Thus, using such method of finding a dent can be time-consuming, inconvenient, and expensive.

As such it would be useful to have a system and method for finding dents on an automobile using a booth.

SUMMARY

A system and method for finding dents on an automobile is described herein. The system, in one embodiment, can be a booth that has a support structure, a plurality of wall sections, a roof, and interior surface defined at least in part by the wall sections and the roof, and a first geometric repeating pattern on a first region of the interior space.

The system, in another embodiment, can be a booth that has a support structure, a plurality of wall sections, an interior space defined by the wall sections and the roof, an interior surface defined at least in part by the wall sections and said the; and a patterned sheet mountable within the interior space. The sheet can have one or more geometric repeating patterns.

The method in one embodiment, can be receiving an automobile within either of the booths described above, illuminating the booth to cause the first geometric repeating pattern of the booth to reflect off a surface of said automobile; and identifying presence of defects using a reflected pattern, the reflected pattern a reflected image of the first geometric repeating pattern on the automobile.

DETAILED DESCRIPTION

Described herein is a system and method for system and method for finding dents on an automobile using a booth. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
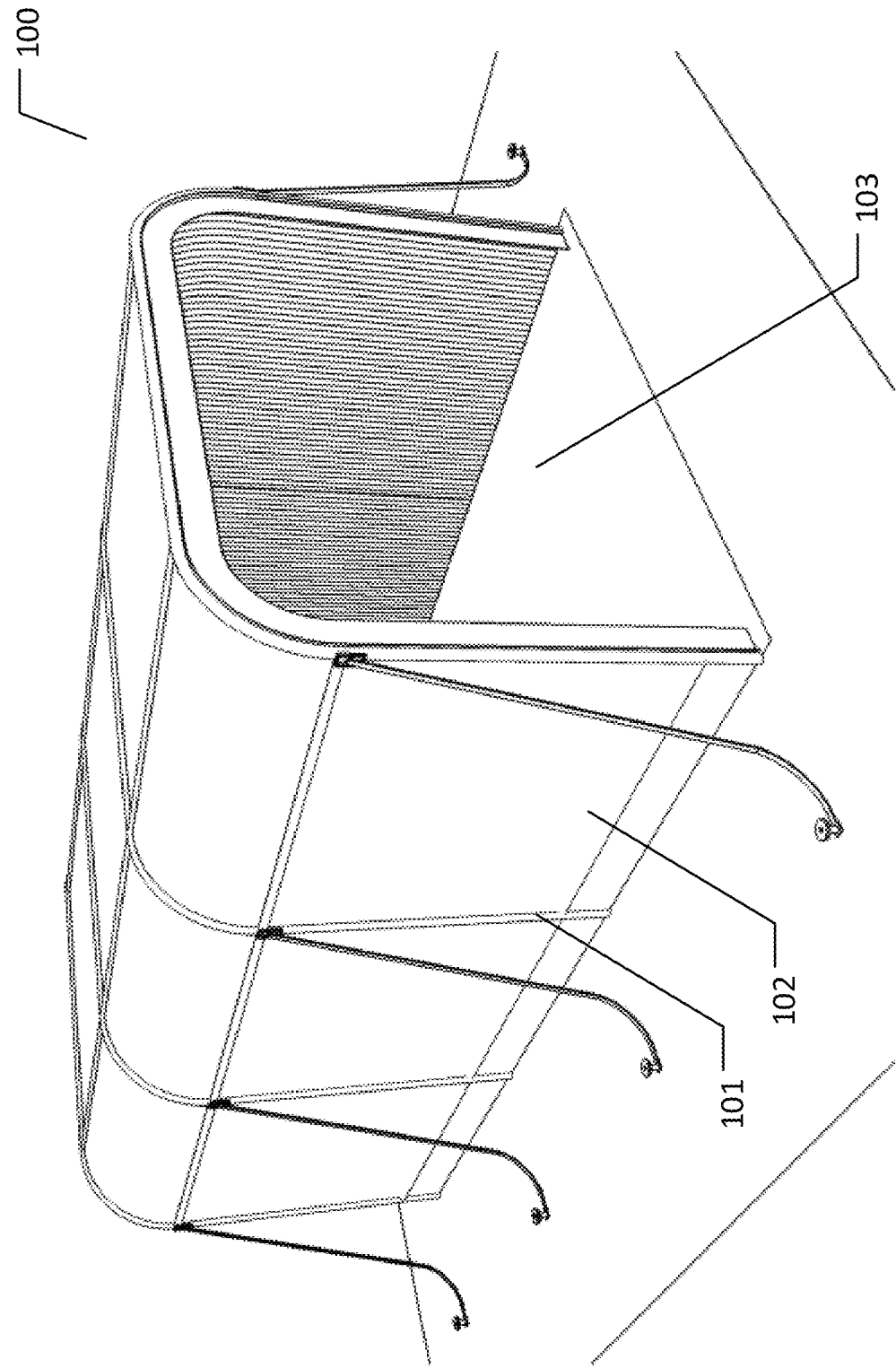
FIG. 1 illustrates a booth.

FIG. 1 illustrates a booth 100. In one embodiment, booth 100 can be portable. Further, in one embodiment, booth can be non-inflatable, as shown in FIG. 1, or inflatable. In a non-inflatable embodiment, a support structure 101 can provide the frame for booth 100. A plurality of wall sections 102 can connect to support structure 101 forming an interior space 103 within booth 100. In an inflatable embodiment, booth 100 can be inflated and deflated for transportation from one location to another. Booth 100 can be large enough to provide an enclosed space for repairing dents on automobiles. Booth 100 can also prevent contaminants from the outer surrounding to enter booth 100. Booth 100 can further aid workers in finding minor damages on automobiles such as dents, as described below.

Figure 2:
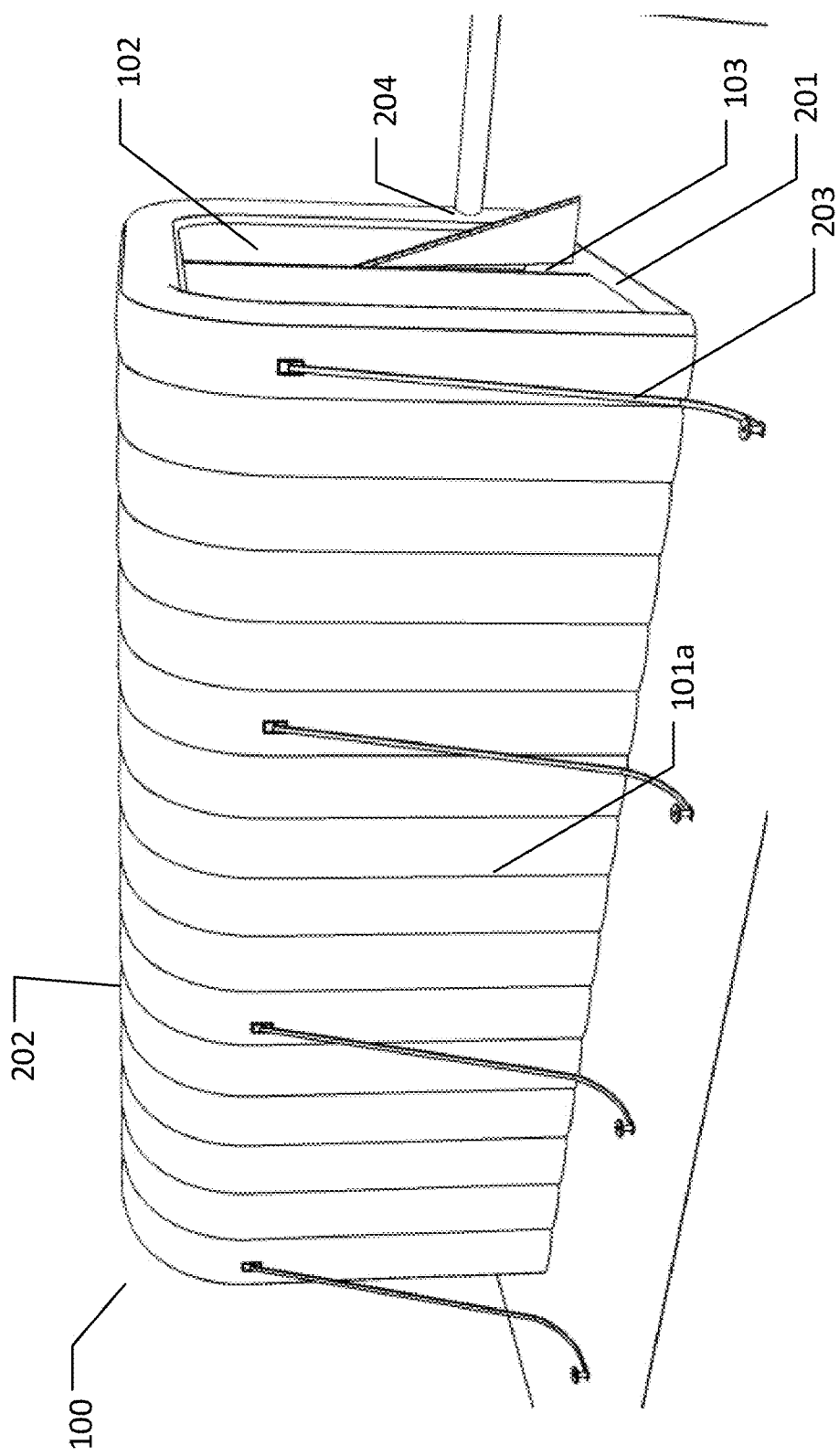
FIG. 2 illustrates an inflatable embodiment of a booth.

FIG. 2 illustrates an inflatable embodiment of booth 100. For purposes of this disclosure, booth 100 can be inflatable or non-inflatable. Booth can comprise any combination of support structures 101, wall sections 102, a floor 201, and a roof 202, sufficient to create an interior space 103 large enough for a vehicle to inhabit and one or more technicians to work within.

As a non-limiting example wherein booth 100 is inflatable, support structures 101 can comprise of inflatable beams 101a. Each support structure 101 can be a plurality of u-shaped round columns connected side-by-side that, once inflated form wall sections 102 and roof 202 of booth 100. Wall sections 102 can comprise inflatable portions, as well as non-inflatable portions. In some embodiments, wall section 102 can comprise all or portion of support structure 101. Floor 201 can be placed at the bottom portion of wall sections 102. In one embodiment, floor 201 can comprise a durable plastic sheeting material such as high-density polyethylene, which can serve as a chemical-resistant barrier to prevent outside contaminates from polluting the work area inside booth 100. Further, in one embodiment, wall sections 102 and floor 201 can comprise a durable sheet material such as plastic, or fabric that can include but are not limited to PVC (polyvinyl chloride) tarpaulins or oxford nylon.

Booth 100 can further comprise a plurality of support ropes 203. Ropes 203 can be used in tying down booth 100 to the ground. If booth 100 is installed in windy areas, ropes 203 can secure booth 100 in place. Booth 100 can further comprise one or more air inlets 204. Air inlets 204 can be connectable to an air pump to allow air to enter and fill up inflatable beams 101*a*. In one embodiment, air inlet 204 can be placed at the outer surface of booth 100. Air inlet 204 can be positioned at the bottom of one of support structure 101.

Figure 3:
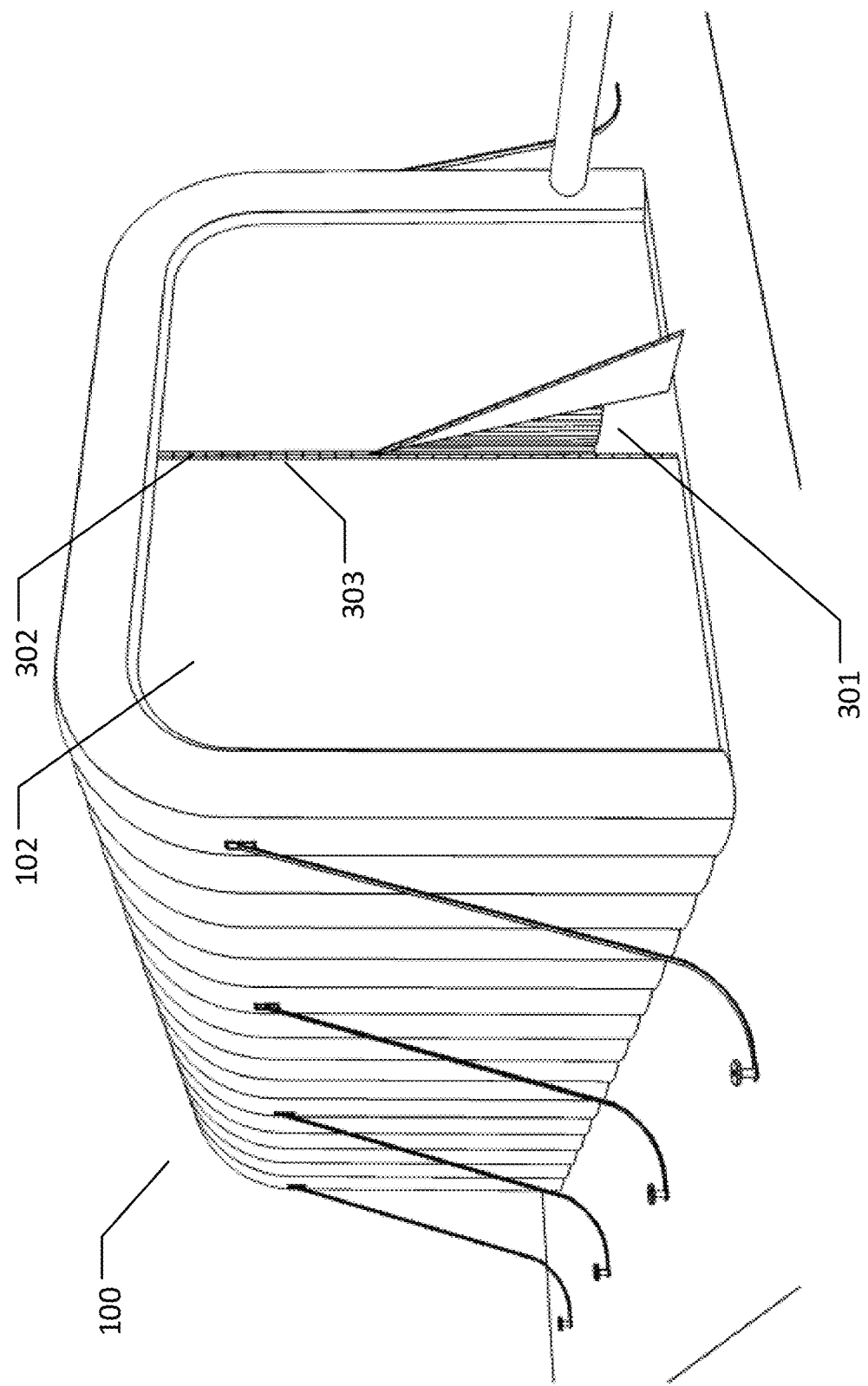
FIG. 3 illustrates one of wall sections comprising a passage.

FIG. 3 illustrates one of wall sections 102 comprising a passage 301. Passage 301 can be an opening large enough to accommodate an automobile. In one embodiment, Passage 301 can comprise a slit 302 at the center of one of wall sections 102. In such structure, wall section 102 with passage 301 can spread open from the bottom center of slit 302 once automobile is driven into booth 100. In one embodiment, passage 301 can be resealable. In such embodiment passage 301 can comprise a resealable fastener 303 that can include but is not limited to zipper, snap, and hook and loop fastener. Thus, booth 100 can be sealed through resealable fastener 303 on passage 301.

Figure 4:
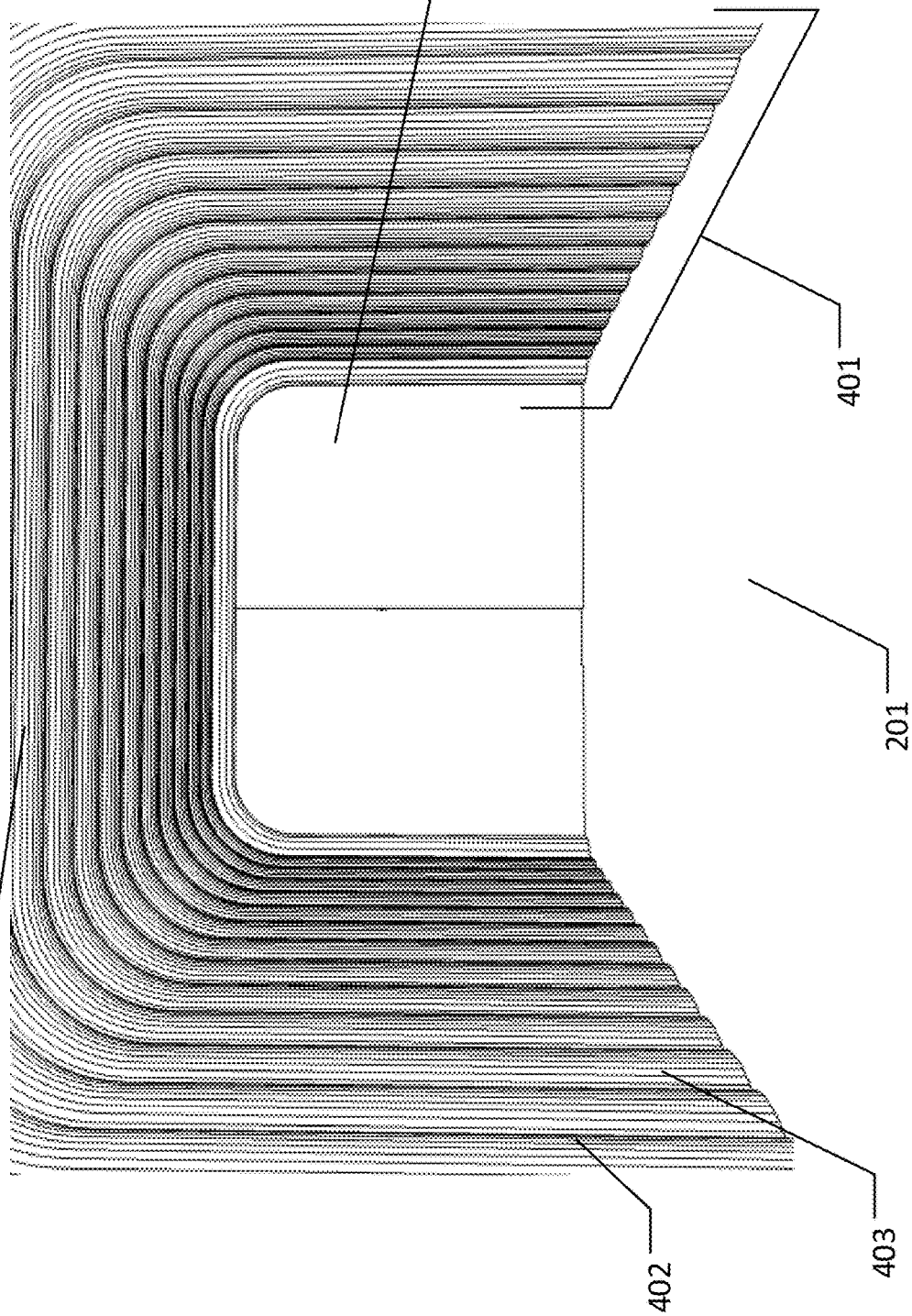
FIG. 4 illustrates an internal view of a booth.

FIG. 4 illustrates an internal view of booth 100. In one embodiment, one or more wall sections 102, floor 201, and/or roof 202 can together form an interior surface 401. Interior surface 401 can comprise one or more geometric repeating patterns 402. Geometric repeating pattern 402 is a pattern of geometric shapes or lines that repeat in a predictable manner. One example of a geometric repeating pattern 402 is a pattern of uniformly spaced vertical lines 403. An example of interior surface 401 comprising a geometric repeating pattern is all or a portion of interior surface 401 comprising uniformly spaced lines, as shown in FIG. 4.

Figure 5:
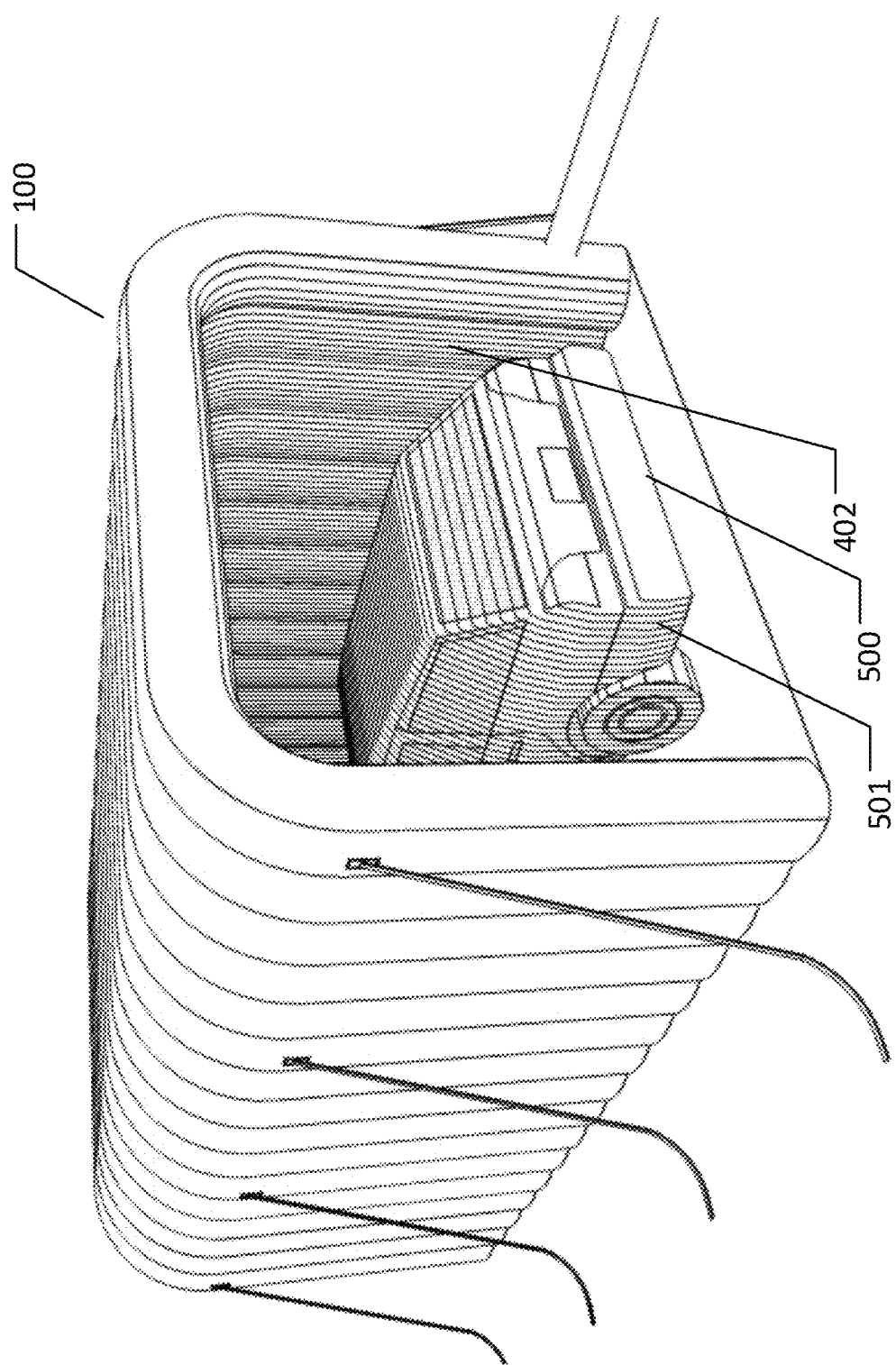
FIG. 5 illustrates an automobile placed within a booth.

FIG. 5 illustrates an automobile 500 placed within booth 100. After erecting booth 100 through inflating, if booth 100 is inflatable or setting up, if booth 100 is non-inflatable, automobile can be driven into interior space 103 of booth 100. Once automobile 500 is within interior space 103, light can cause geometric repeating pattern 402 to reflect off the surface of automobile 500, the reflected image of geometric repeating pattern 402 hereinafter referred to as reflected pattern 501. Thus, through reflected pattern 501 exterior surface of an automobile can be assessed for damages such as dents, and/or scrapes.

Figure 6:
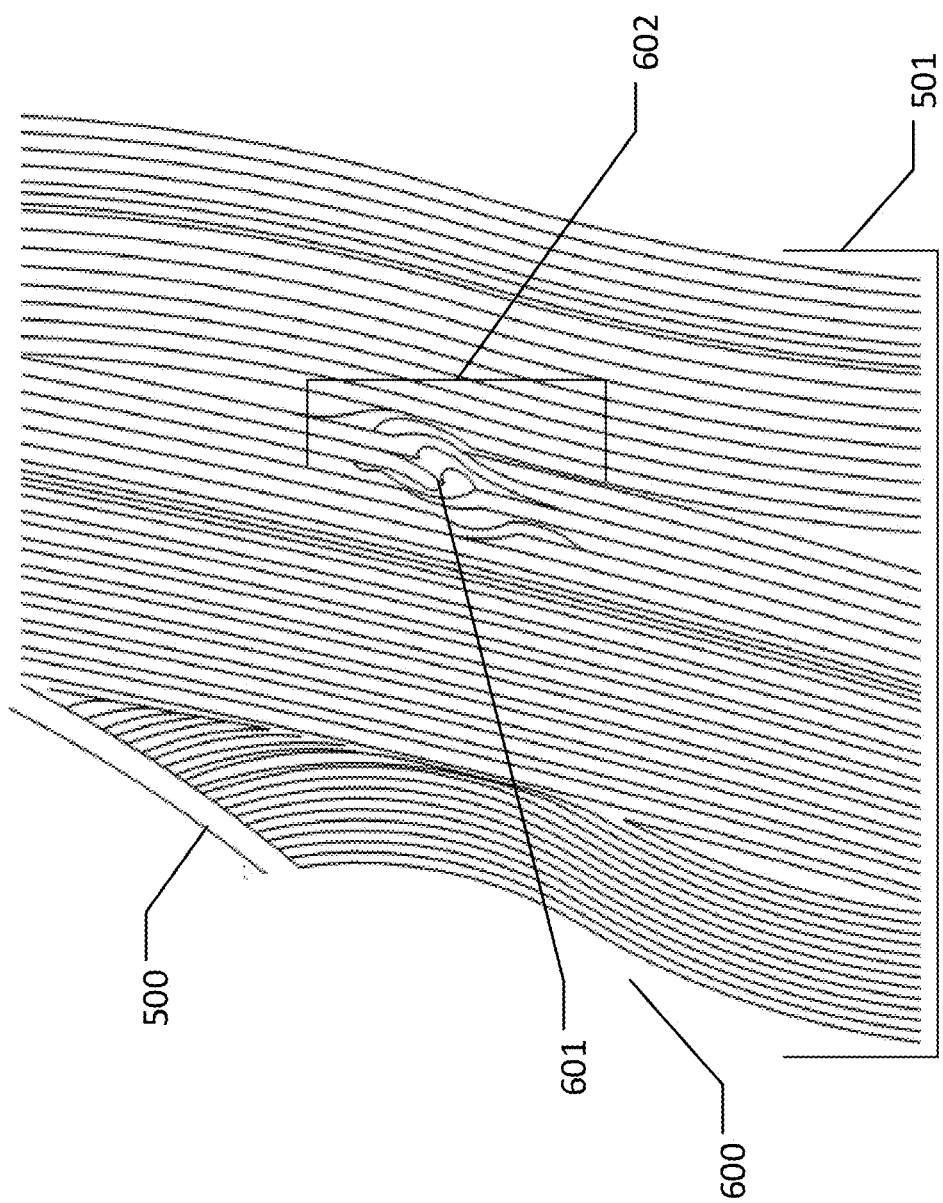
FIG. 6 illustrates a surface portion of an automobile having a defect.

FIG. 6 illustrates a surface portion 600 of automobile 500 having a defect 601. When reflected pattern 501 appears substantially similar to geometric repeating pattern 402, such is an indication the surface of automobile 500 is free of any defects 601 or any other flaws. For example, in an embodiment wherein geometric repeating pattern 402 is a pattern of uniformly spaced parallel lines, reflected pattern 501 also being parallel and uniformly spaced can indicate the surface of automobile 500 is free of defects 601, or other defects. However, if a distortion 602 is present in reflected pattern 501, that is to say, the shape of reflected pattern 501 deviates in shape from geometric repeating pattern 402, then distortion 602 is evidence of defect 601. For example, when geometric repeating pattern 402 is distorted such that they are not parallel, such occurrence can indicate damage on the surface. Using this system and method, workers can easily locate and identify even defects 601 such as minor dents and scratches on automobile 500.

Figure 7:
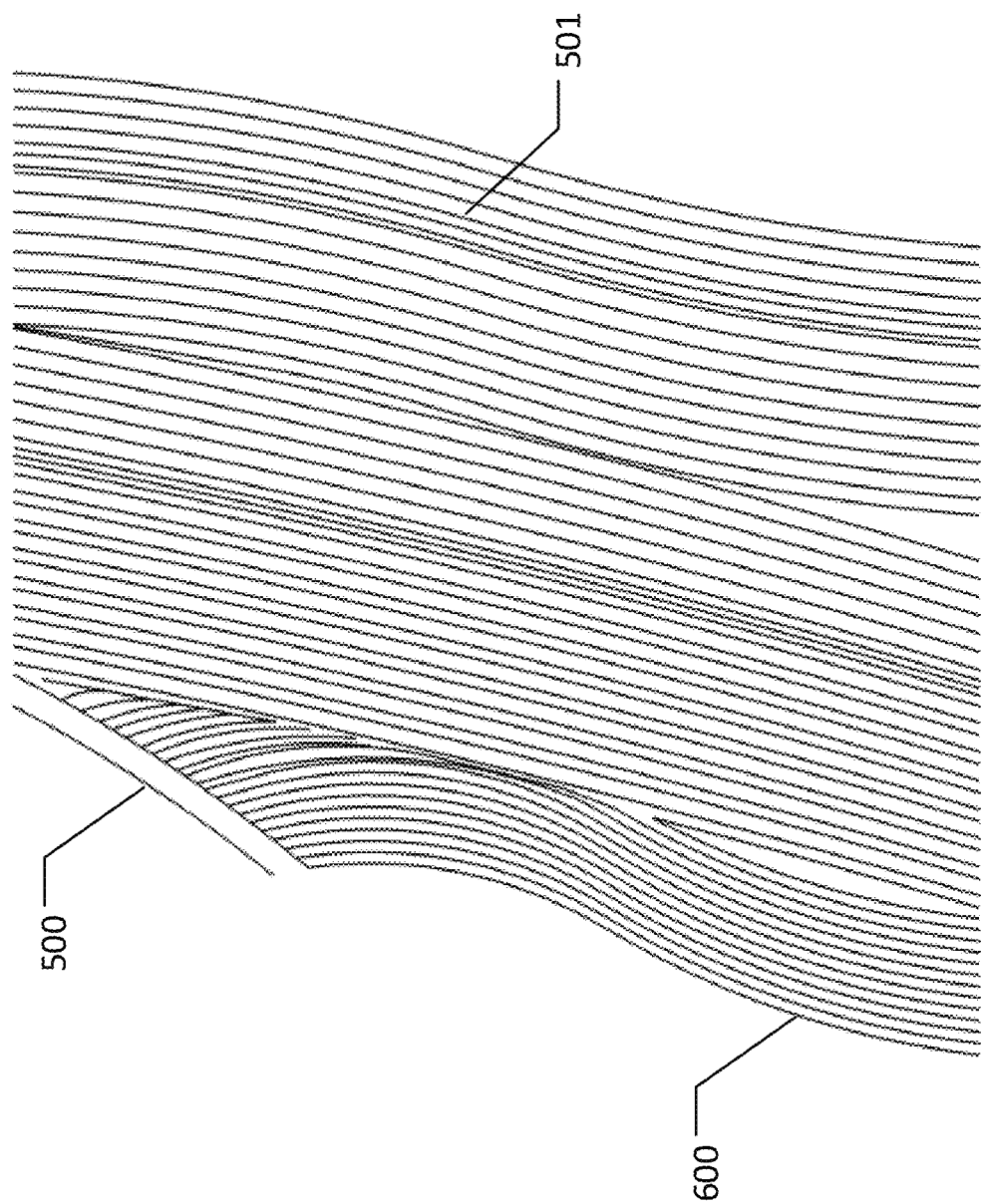
FIG. 7 illustrates a surface portion of an automobile once a defect has been repaired.

FIG. 7 illustrates surface portion 600 of automobile 500 once defect 601 has been repaired. Once a technician is done fixing defect 601, reflected pattern 501 can also be used to guarantee defect 601 has been fixed. By substantially decreasing or eliminating distortion 602, defect 601 can be eliminated. For example, when geometric repeating pattern 402 is a set of parallel lines, defect 601 has been fixed when reflected pattern 501 can reflect off surface portion 600 of automobile 500 parallel or substantially parallel, only curving with the contour of the vehicle.

Figure 8:
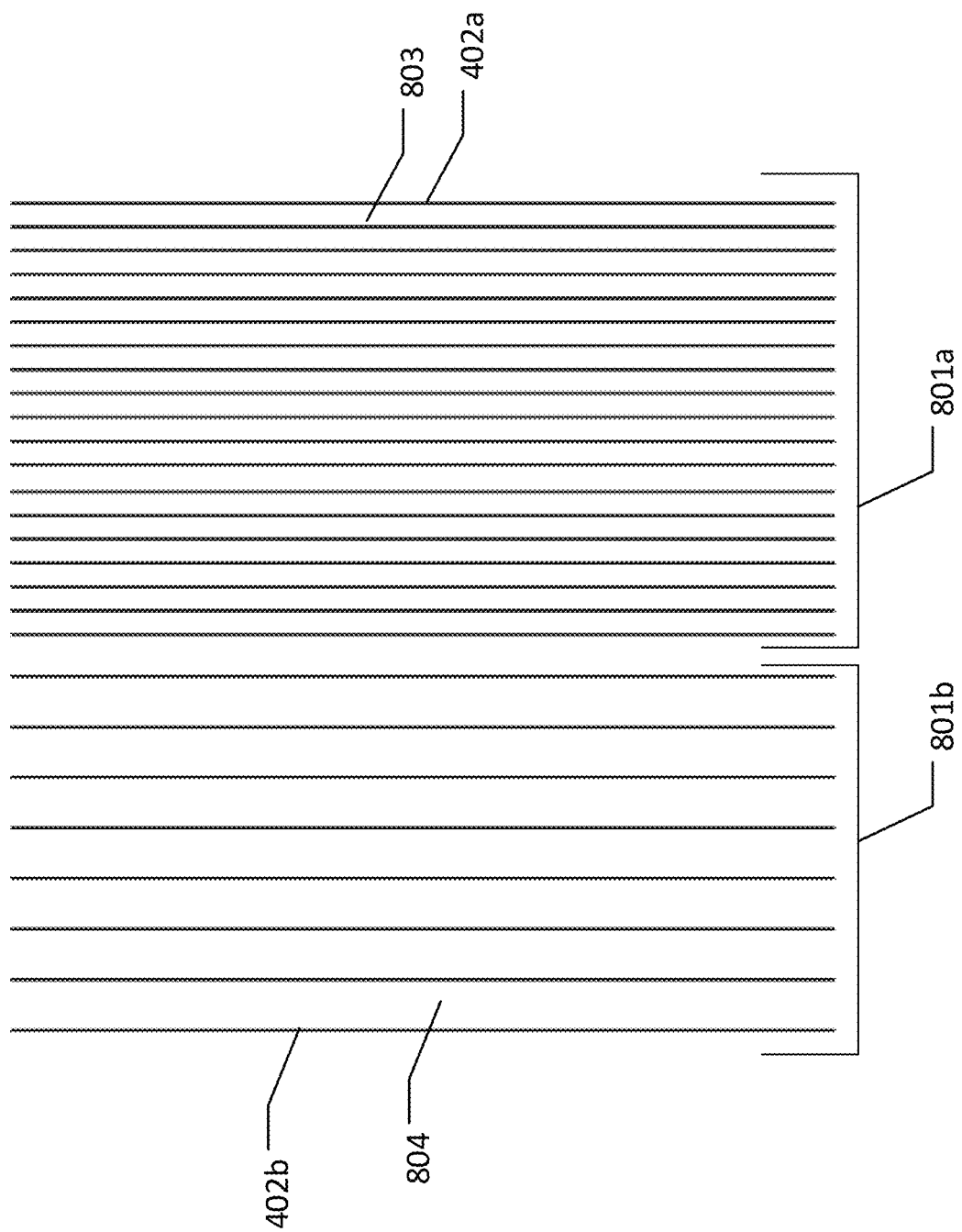
FIG. 8 illustrates a portion of an interior surface comprising a first geometric repeating pattern in a first region and a second geometric repeating pattern on a second region.

FIG. 8 illustrates a portion of interior surface 401 comprising a first geometric repeating pattern 402*a* in a first region 801*a*, and a second geometric repeating pattern 402*b* on a second region 802*b*. One reason for multiple geometric repeating patterns 402 is taking into consideration an anticipated distance between each region 801 and surface portion 600. For example, if the anticipated distance between the two is great, such as between roof 205 and the hood of automobile 500, geometric repeating pattern 402 can be large, and if the anticipated distance between the two is small, geometric repeating pattern 402 can be smaller.

As an example shown in FIG. 8, a first geometric repeating pattern 402 on first region 801*a* can have a first spacing 803, while second geometric repeating pattern 402*b* on second region 801*b* can have a second spacing 804. In such example, second spacing 806 can be larger than first spacing 804. First spacing 803 and second spacing 804 can be the space in between each line in geometric repeating pattern 402.

Figure 9:
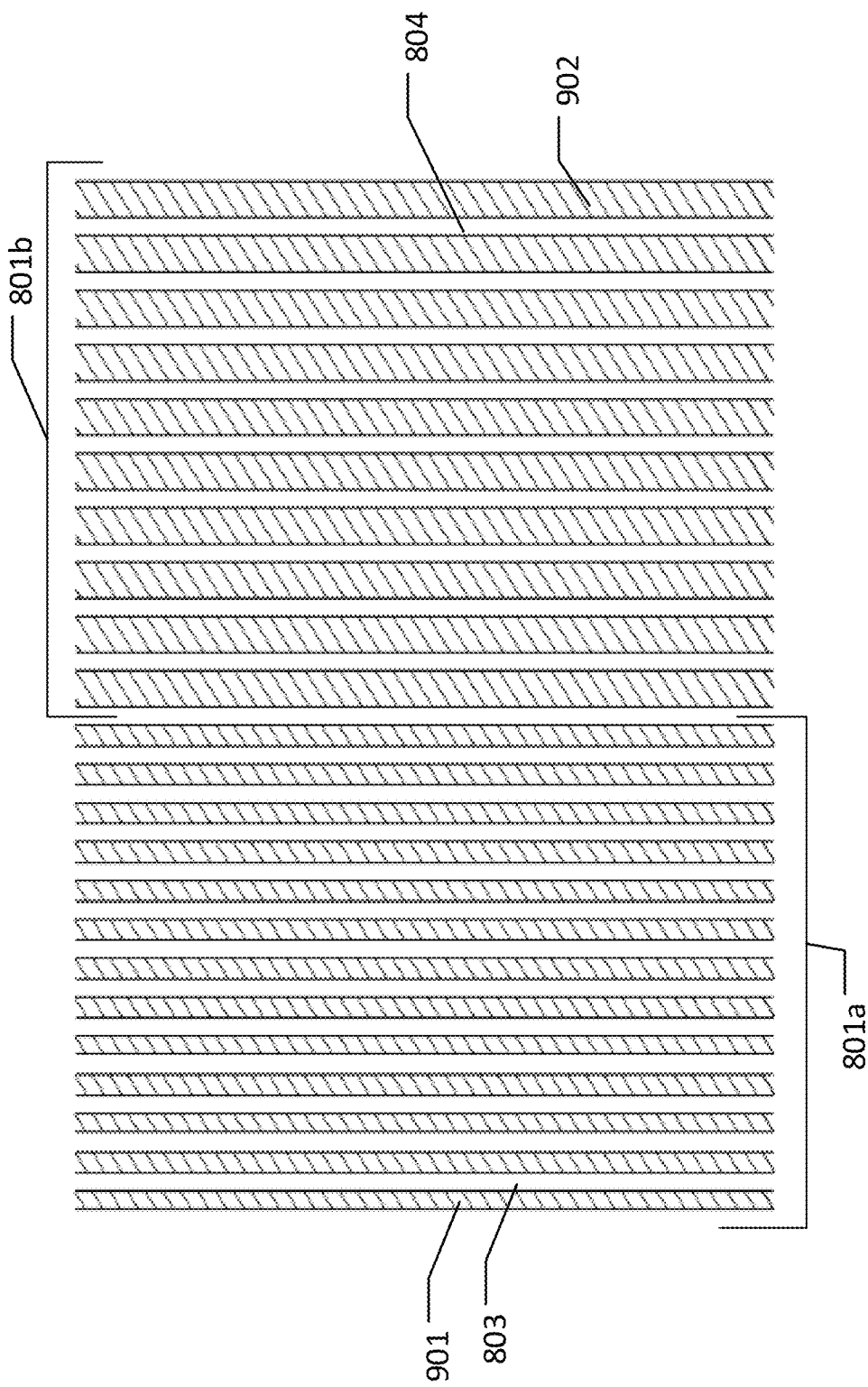
FIG. 9 illustrates another example of geometric repeating pattern on an interior surface.

FIG. 9 illustrates another example of geometric repeating pattern 402. In this example, first geometric repeating pattern 402*a* on first region 801*a* can have a first set of line weight 901, while second geometric repeating pattern 402*b* on second region 801*b* can have a second set of line weight 902. In one embodiment, first spacing 803 in between first geometric repeating pattern 402*a* can be the same with second spacing 804 in between second geometric repeating pattern 402*b*. Furthermore, second line weight 902 can be thicker than first line weight 901.

Figure 10:
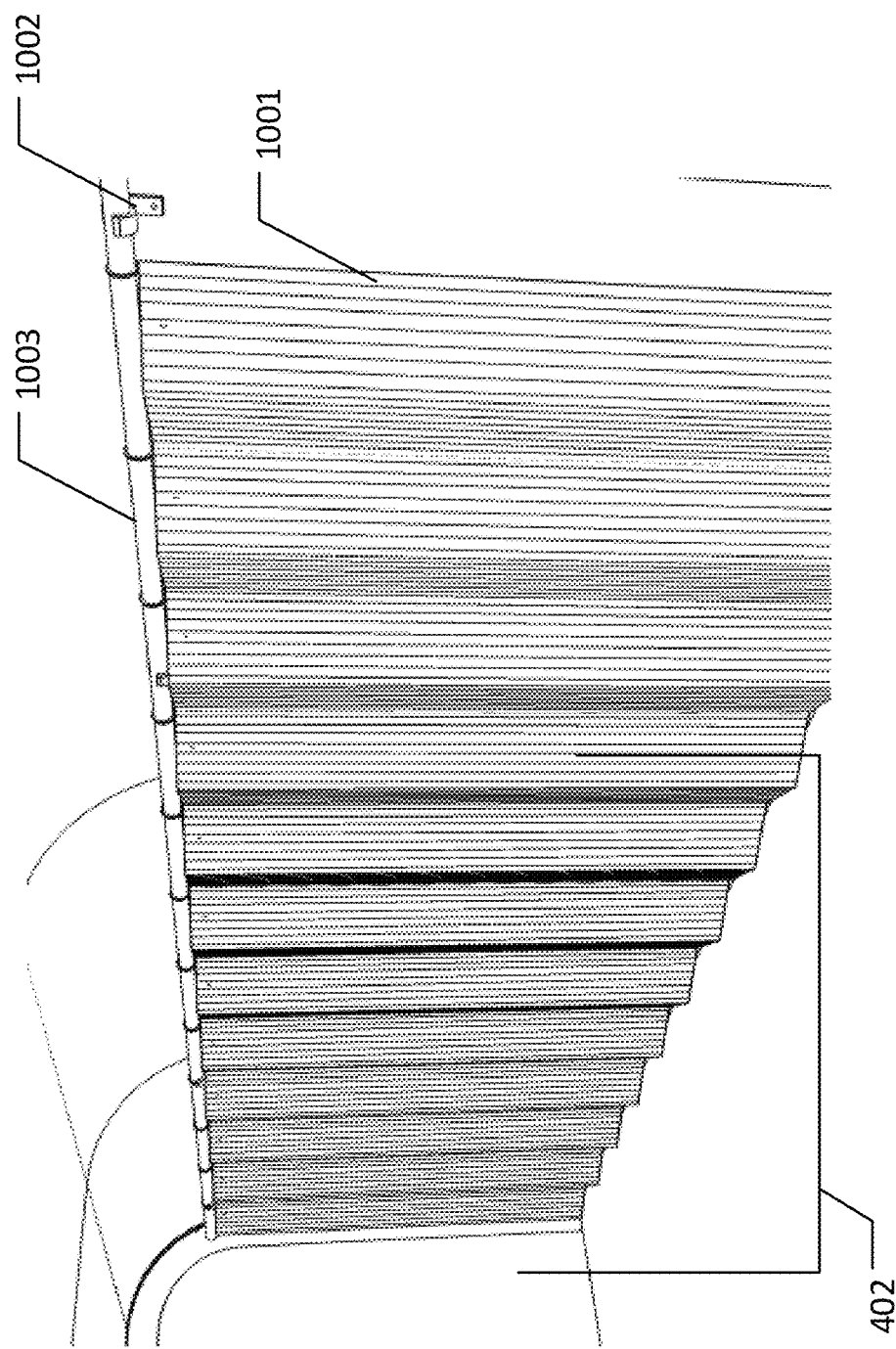
FIG. 10 illustrates a booth comprising a sheet.

FIG. 10 illustrates a booth 100 comprising a patterned sheet 1001. In such embodiment, patterned sheet 1001 can comprise one or more geometric repeating patterns 402. Patterned sheet 1001 can be mountable to support structure 101. As such, patterned sheet 101 can cover interior surface 401. Further in one embodiment, patterned sheet 1001 can be a type of drapery such as curtains, shades, or blinds. In one embodiment, patterned sheet 1001 can be mounted within booth 100 through method that can include but is not limited to fastening. In such embodiment, patterned sheet 1001 can comprise a plurality of hooks 1002 and one or more rods 1003. As an example embodiment, hooks 1002 can be an S-shape hook wherein one portion of each hook 1002 can be attached to the frame of booth 100 while the other portion of each hook 1002 can secure rods 1003. In another embodiment, patterned sheet 1001 can be maneuverable within booth 100. In such embodiment, patterned sheet 1001 can be mounted to a freestanding support.

Figure 11:
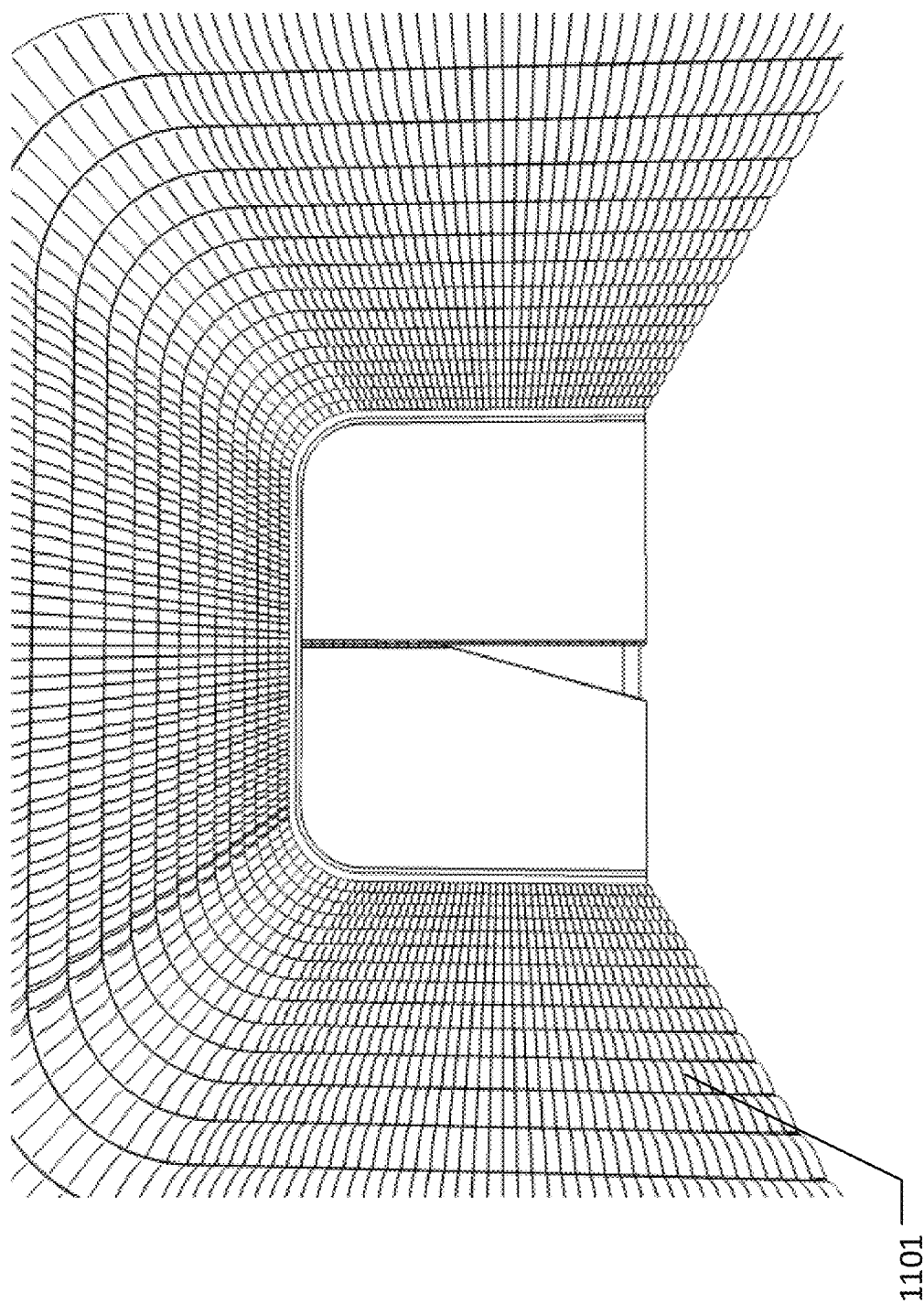
FIG. 11 illustrates another example of a geometric repeating pattern on an interior surface.

FIG. 11 illustrates another example of geometric repeating pattern 402 on interior surface 401. In such example, geometric repeating pattern 402 can comprise a set of uniformly spaced horizontal lines 1101.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for finding dents on an automobile comprising the steps of:
   parking an automobile within an inflatable booth, said inflatable booth comprising
      a support structure comprising a plurality of parallel inflatable beams connected side-by-side forming a plurality of wall sections and a roof, and an air inlet;
      an interior surface defined at least in part by said wall sections and said roof; and
      a first geometric repeating pattern on a first region of said interior surface and a second geometric repeating pattern on a second region of said interior surface, wherein either
      (a) said first geometric repeating pattern is a first set of uniformly spaced lines having a first spacing, and wherein said second geometric repeating pattern is a second set of uniformly spaced lines having a second spacing, said second spacing being larger than said first spacing,
      (b) said first geometric repeating pattern is a first set of uniformly spaced lines having a first line weight, and wherein said second geometric repeating pattern is a second set of uniformly spaced lines having a second line weight, said second line weight being thicker than said first line weight, or
      (c) said first geometric repeating pattern is a first set of uniformly spaced lines running in a direction perpendicular to the length of said booth, and wherein said second geometric repeating pattern is a second set of uniformly spaced lines running in a direction parallel to the length of said booth;
   illuminating said inflatable booth to cause at least one of said first and second geometric repeating patterns to reflect off a surface of said parked automobile; and
   identifying presence of defects using a reflected pattern, said reflected pattern being a reflected image of at least one of said first and second geometric repeating patterns on said parked automobile.

2. The method of claim 1 further comprising the step of finding a distortion from said reflected pattern on said parked automobile.

3. The method of claim 1 further comprising the step of fixing said defects until said distortion on said reflected pattern is eliminated.

4. A method for finding dents on an automobile comprising the steps of
   parking an automobile within an inflatable booth, said inflatable booth comprising
      a support structure comprising a plurality of parallel inflatable beams connected side-by-side forming a plurality of wall sections and a roof, and an air inlet;
      one of said wall section comprising a passage;
      an interior space defined by said wall sections and said roof;
      an interior surface defined at least in part by said wall sections and said roof;
      a patterned sheet mountable within said interior space, said sheet comprising a first geometric repeating pattern on a first region of said sheet and a second geometric repeating pattern on a second region of said sheet, wherein either
      (a) said first geometric repeating pattern is a first set of uniformly spaced lines having a first spacing, and wherein said second geometric repeating pattern is a second set of uniformly spaced lines having a second spacing, said second spacing being larger than said first spacing,
      (b) said first geometric repeating pattern is a first set of uniformly spaced lines having a first line weight, and wherein said second geometric repeating pattern is a second set of uniformly spaced lines having a second line weight, said second line weight being thicker than said first line weight, or
      (c) said first geometric repeating pattern is a first set of uniformly spaced lines running in a direction perpendicular to the length of said booth, and wherein said second geometric repeating pattern is a second set of uniformly spaced lines running in a direction parallel to the length of said booth; and
   illuminating said inflatable booth to cause at least one of said first and second geometric repeating patterns to reflect off a surface of said parked automobile; and
   identifying presence of defects using a reflected pattern, said reflected pattern being a reflected image of at least one of said first and second geometric repeating patterns on said parked automobile.

5. The method of claim 4 wherein said patterned sheet is mounted to said interior surface.

6. The method of claim 4 wherein said patterned sheet is mounted to a freestanding support structure within said interior space.

7. A method for finding dents on an automobile comprising the steps of:
   parking an automobile within a portable dent repair system, said portable dent repair system comprising:
      an inflatable booth comprising a plurality of inflatable walls, an inflatable roof, and an air inlet;
      an interior surface defined at least in part by said walls and said roof; and
      a first geometric repeating pattern on a first region of said interior surface and a second geometric repeating pattern on a second region of said interior surface, wherein either
      (a) said first geometric repeating pattern is a first set of uniformly spaced lines having a first spacing, and wherein said second geometric repeating pattern is a second set of uniformly spaced lines having a second spacing, said second spacing being larger than said first spacing,
      (b) said first geometric repeating pattern is a first set of uniformly spaced lines having a first line weight, and wherein said second geometric repeating pattern is a second set of uniformly spaced lines having a second line weight, said second line weight being thicker than said first line weight, or
      (c) said first geometric repeating pattern is a first set of uniformly spaced lines running in a direction perpendicular to the length of said booth, and wherein said second geometric repeating pattern is a second set of uniformly spaced lines running in a direction parallel to the length of said booth;
   illuminating said inflatable booth to cause at least one of said first and second geometric repeating patterns to reflect off a surface of said parked automobile; and identifying presence of defects using a reflected pattern, said reflected pattern being a reflected image of at least one of said first and second geometric repeating patterns on said parked automobile.

* * * * *